(12) United States Patent
Gilhuys et al.

(10) Patent No.: US 6,450,744 B1
(45) Date of Patent: Sep. 17, 2002

(54) OVERRIDEABLE VERTICAL RESTRAINT FOR CARGO HANDLING SYSTEMS

(75) Inventors: Daniel Roger Gilhuys, Lomita; Rosario Simon Saggio, Arcadia; Karlton Kazumi Okamoto, Lakewood, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/792,472

(22) Filed: Feb. 23, 2001

(51) Int. Cl.[7] .................................................. B60P 7/08
(52) U.S. Cl. .......................... 410/69; 410/77; 410/79; 410/80; 410/92
(58) Field of Search .......................... 410/69, 77, 78, 410/79, 80, 92, 94; 244/118.1, 137.1; 414/536; 248/500, 503

(56) References Cited

U.S. PATENT DOCUMENTS

| | | | |
|---|---|---|---|
| 3,796,397 A | 3/1974 | Alberti | |
| 3,927,622 A | 12/1975 | Voigt | |
| 4,121,789 A | 10/1978 | Lent, et al. | |
| 4,234,278 A * | 11/1980 | Harshman et al. | 410/69 |
| 4,331,412 A * | 5/1982 | Graf | 410/69 |
| 4,349,302 A * | 9/1982 | Ferguson, Jr. | 410/69 |
| 4,379,668 A * | 4/1983 | Pelletier | 410/77 |
| 4,457,649 A * | 7/1984 | Vogg et al. | 410/46 |
| 4,557,648 A * | 12/1985 | Koch et al. | 410/78 |
| 4,583,896 A | 4/1986 | Vogg, et al. | 410/69 |
| 4,696,609 A | 9/1987 | Cole | 410/69 |
| 5,004,387 A * | 4/1991 | Jensen et al. | 410/69 |
| 5,011,348 A | 4/1991 | Jensen et al. | 410/79 |
| 5,098,038 A | 3/1992 | Hruska et al. | |
| 5,112,173 A | 5/1992 | Eilenstein et al. | 410/79 |
| 5,265,991 A | 11/1993 | Herrick et al. | 410/69 |
| 5,356,250 A | 10/1994 | Vogg et al. | 410/86 |
| 5,486,077 A | 1/1996 | Nutting | 410/69 |
| 5,564,654 A | 10/1996 | Nordstrom | |
| 5,573,359 A * | 11/1996 | Moradians | 410/69 |
| 5,692,862 A * | 12/1997 | Hilde | 410/69 |
| 5,816,758 A | 10/1998 | Huber | 410/77 |
| 5,871,317 A * | 2/1999 | Huber et al. | 410/79 |
| 5,921,732 A | 7/1999 | Chauhan | 410/77 |
| 5,957,406 A | 9/1999 | Nelson et al. | |
| 6,039,519 A | 3/2000 | Jones et al. | 410/69 |
| 6,193,453 B1 * | 2/2001 | Kernkamp | 410/79 |
| 6,270,300 B1 * | 8/2001 | Huber et al. | 410/69 |
| 6,318,938 B1 * | 11/2001 | Araujo | 410/79 |

* cited by examiner

*Primary Examiner*—Stephen T. Gordon
(74) *Attorney, Agent, or Firm*—Harness Dickey & Pierce P.L.C.

(57) ABSTRACT

A cargo restraint system for retaining a cargo pallet. The cargo restraint system comprising a frame having a receiving channel and a pallet latching member. The pallet latching member is rotatably coupled at a first end to the frame for pivotal movement between a stowed position and a retaining position. The latch member includes a pair of camming surfaces that are engageable with the cargo pallet during an overriding movement of the cargo pallet, which forces the pallet latching member into the stowed position. The pallet latching member has an overall maximum width that is less than a width of the receiving channel of the frame to eliminate any wing-like feature and minimize the potential for damage to the pallet latching member caused by inadvertent snagging of the pallet latching member by the cargo pallet.

20 Claims, 5 Drawing Sheets

US 6,450,744 B1

OVERRIDEABLE VERTICAL RESTRAINT FOR CARGO HANDLING SYSTEMS

FIELD OF THE INVENTION

The present invention relates to cargo restraints for securing a cargo container or pallet and, more particularly, relates to an improved cargo restraint that minimizes the likelihood of damage caused by snagging of the cargo pallet on the cargo restraint.

BACKGROUND OF THE INVENTION

As is well known in the art, cargo restraints are commonly used in aircraft and other vehicles to secure cargo containers or pallets to prevent excessive movement during transport. Typically, cargo containers are loaded, handled, and aligned into their approximate position within the compartment of the aircraft. As the cargo container is positioned into its final position, a retractable cargo restraint is lifted from a position generally within the floor into an engaged and locked position. The cargo restraint overlaps a flange-like portion or pocket of the cargo container and secures the cargo container relative to the floor to minimize vertical and horizontal movement thereof. However, it is often necessary for these cargo restraints to be overrideable. That is, these restraints should be capable of being deflected downwardly to enable a cargo pallet to slide thereover.

As illustrated in U.S. Pat. No. 5,011,348, which is commonly assigned and the disclosure of which is hereby incorporated by reference, a cargo restraint is shown having a wing-type camming feature. As best seen in FIG. 1 herein, the cargo restraint 200 is pivotally mounted to the longitudinal members 202 of a frame 204. The cargo restraint 200 includes a central base 206 having a tapered extension 208 on each forward and aft side. The tapered extension 208 has an upwardly sloping camming surface 210, which causes the cargo restraint 200 to retract downwardly into the frame 204 upon engagement by a cargo body. As can be appreciated from the figure, tapered extensions 208 have the aforementioned wing-type configuration. However, this wing-type configuration may not afford maximum protection against snagging or other contact with the cargo pallet.

Cargo pallets are often covered with a cargo netting which drapes over the sides and down to the floor of the cargo area. This cargo netting is particularly susceptible to snagging on tapered extensions 208. Potentially, the cargo netting may cause damage to the cargo restraint or, in some situations, cause damage to the underlying frame structure. Damage to the cargo restraint and/or frame structure may lead a delay in scheduling of the aircraft in order to accommodate the necessary time for repairs. It should be appreciated, that any delay in flight scheduling may equate to a potential for loss revenue.

Moreover, this wing-type cargo restraint typically requires expensive forging dies for its manufacture and, furthermore, requires an exorbitant amount of machining time to create the final configuration. Still further, the sheer size of the wing-type cargo restraint requires additional material, which increases the cost of manufacture.

Accordingly, there exists a need in the relevant art to provide an overrideable cargo restraint that is capable of minimizing the likelihood of snags and/or inadvertent damaging contact between the cargo pallet and the cargo restraint. Furthermore, there exists a need in the relevant art to provide an overrideable cargo restraint that eliminates or at least minimizes the existence of overhanging features, which have the potential of being snagged and/or damaged. Still further, there exists a need in the relevant art to provide a cargo restraint that is capable of overcoming the disadvantages of the prior art systems.

SUMMARY OF THE INVENTION

In accordance with the broad teachings of the present invention, a cargo restraint system for retaining a cargo pallet having an advantageous design is provided. The cargo restraint system comprises a frame having a receiving channel and a pallet latching member. The pallet latching member is rotatably coupled at a first end to the frame for pivotal movement between a stowed position and a retaining position. The latch member includes a pair of camming surfaces that are engageable with the cargo pallet during an overriding movement of the cargo pallet, which forces the pallet latching member into the stowed position. The pallet latching member has an overall maximum width that is less than a width of the receiving channel of the frame to eliminate any wing-like feature and minimize the potential for damage to the pallet latching member caused by inadvertent snagging of the pallet latching member by the cargo pallet.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
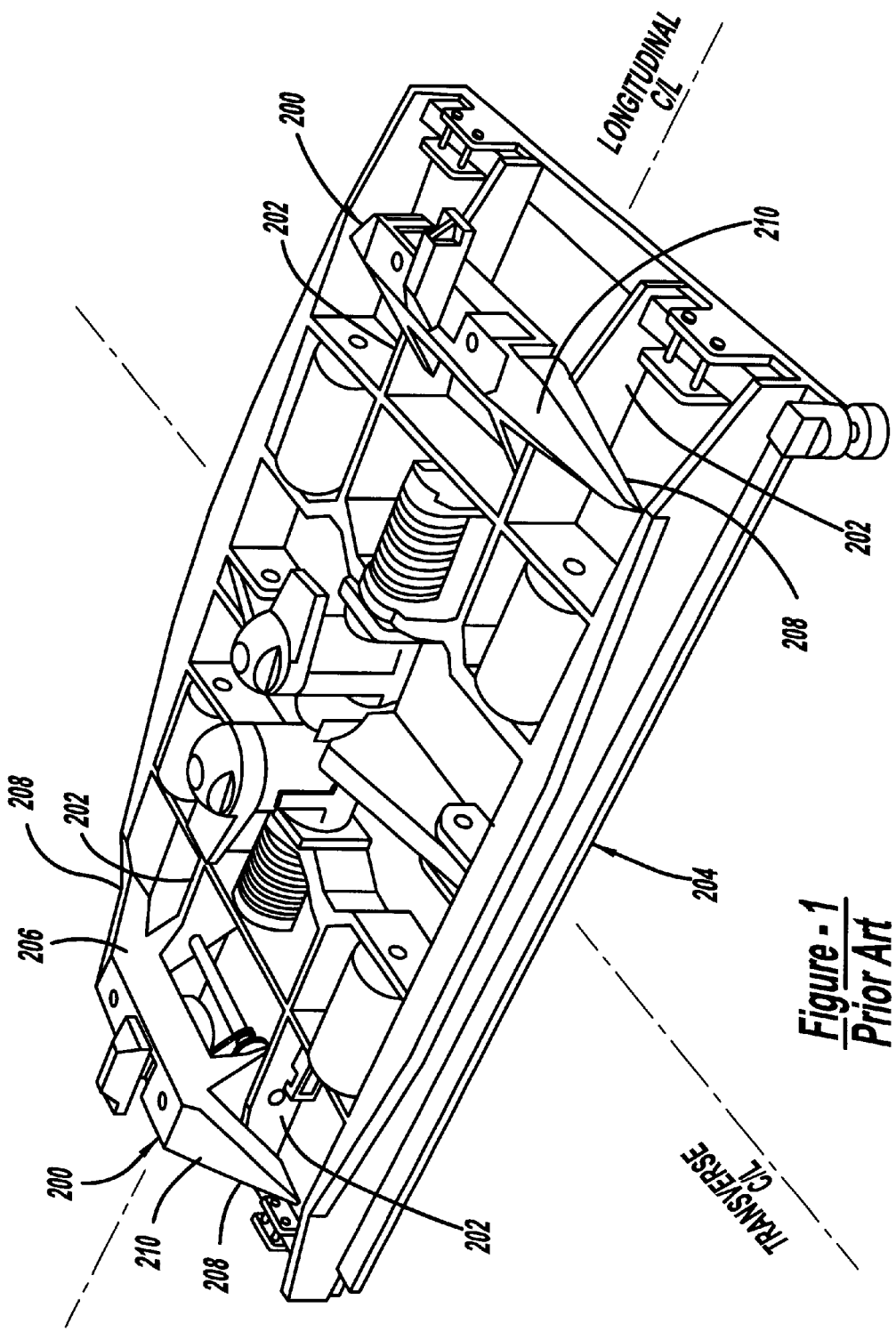
FIG. 1 is a perspective view illustrating an overrideable cargo restraint system having wing-type camming surfaces according to the prior art.
Figure 2:
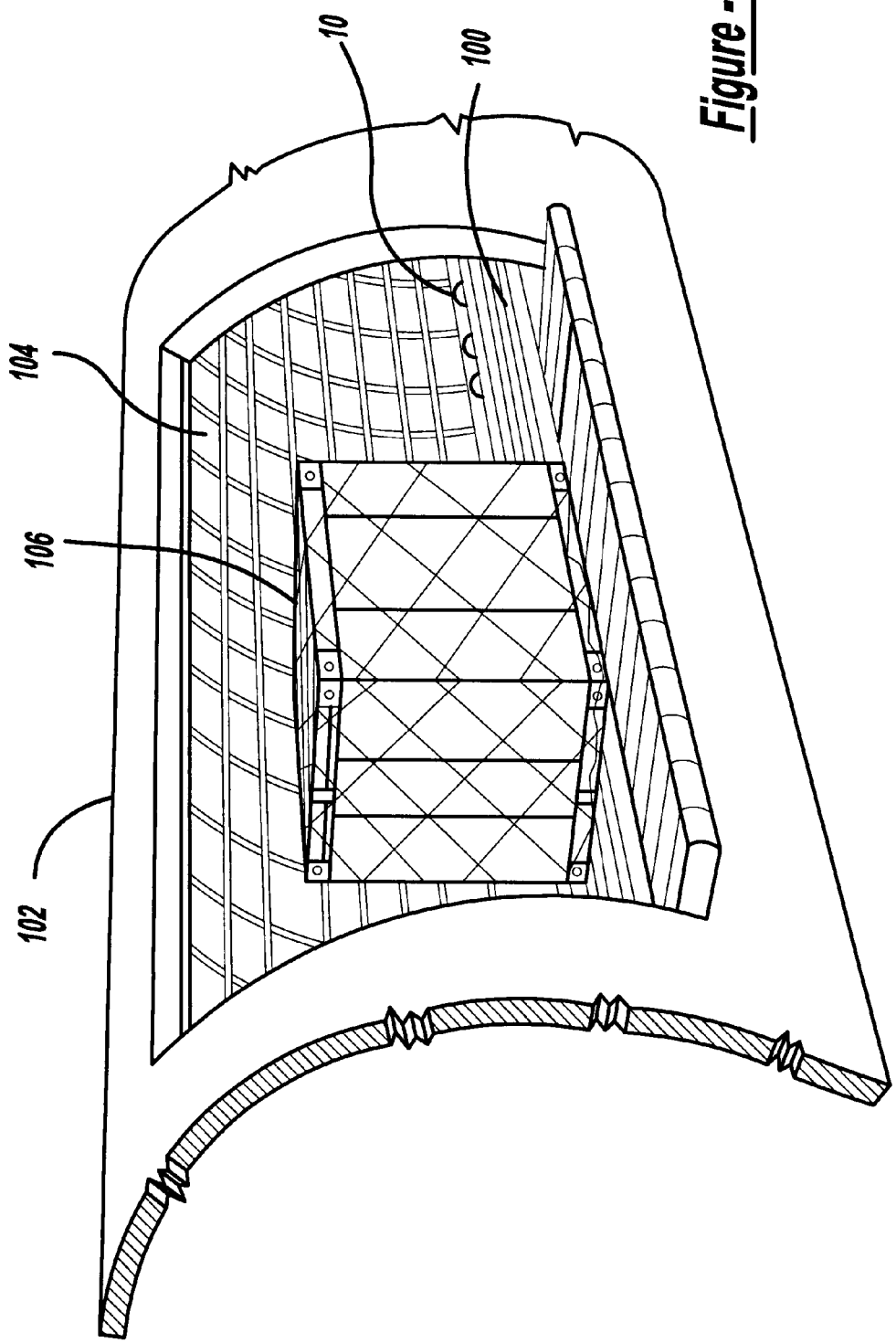
FIG. 2 is an environmental view illustrating an aircraft cargo area employing a plurality of overrideable cargo restraint systems according to the principles of the present invention.

The following description of the preferred embodiment is merely exemplary in nature and is in no way intended to limit the invention, its application, or uses.

Referring to FIGS. 2–7, a cargo restraint system 10 is provided for latching and unlatching cargo containers or pallets in a quick and efficient manner. Cargo restraint system 10 includes a frame or base structure 12 that is adapted to be received within a fore-and-aft track 100 formed in the flooring of an aircraft or cargo vehicle 102, or possibly a railroad car or truck. Such fore-and-aft tracks 100 are of conventional design and, thus, in the interest of brevity, they will not be described in detail herein. Furthermore, in the interest of brevity, cargo restraint system 10 of the present invention will be described in connection with an aircraft cargo area 104. However, it should be understood that the principles of the present invention are equally applicable to other applications, such as in trucks, railroad cars, and the like.

Cargo container 106 is typically loaded into cargo area 104 of aircraft 102 using various motor driven wheels and/or casters to enable cargo container 106 to be efficiently moved throughout cargo area 104. Once cargo container 106 is properly aligned in the cargo area, a plurality of cargo restraint systems 10 are used to retain or secure cargo container 106 in place during transport. Thus, cargo container 106 is prevented from moving laterally by cargo restraint system 10.

Cargo restraint device 10 is commonly mounted within tracks 100 of cargo area 104 in pairs to cooperate to retain each lateral side of each cargo container 106. However, it should be understood that a single cargo restraint system 10 could be used on each lateral side of cargo container 106 depending on the holding capacity required.

Referring now to FIGS. 3–7, cargo restraint system 10 includes base structure 12, a pair of T-section studs 14 extending from the planar undersurface of base structure 12, optional roller elements 16, and a latching or retaining member 18. Each T-section stud 14 is adapted to be received within and retained by a channel (not shown) formed in tracks 100 of the cargo area floor. Base structure 12 is then secured or otherwise locked into engagement with tracks 100 to prevent the relative movement of cargo restraint system 10 relative to tracks 100.

Roller elements 16 are each adapted to support and guide cargo container 106 while it is moved across cargo restraint system 10. To this end, each roller element 16 is pivotally journaled to base structure 12 via a roller axle 20. As can be appreciated from the figures, roller elements 16 are oriented such that they provide a roller support for cargo container 106 as it moves longitudinally within the aircraft cargo area.

Figure 3:
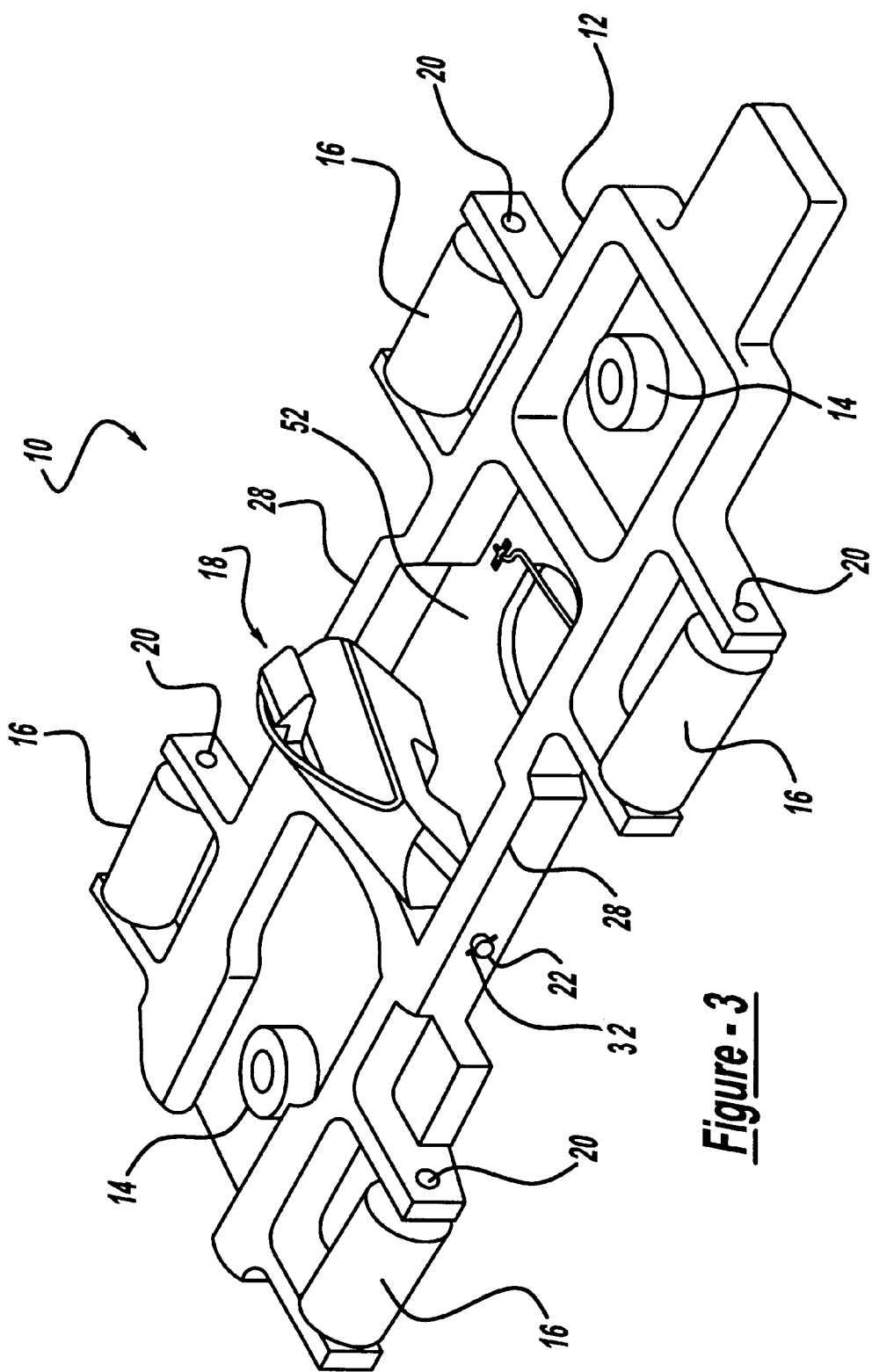
FIG. 3 is a perspective view illustrating the cargo restraint system according to the principles of the present invention with the retaining member in a raised or retaining position.
Figure 4:
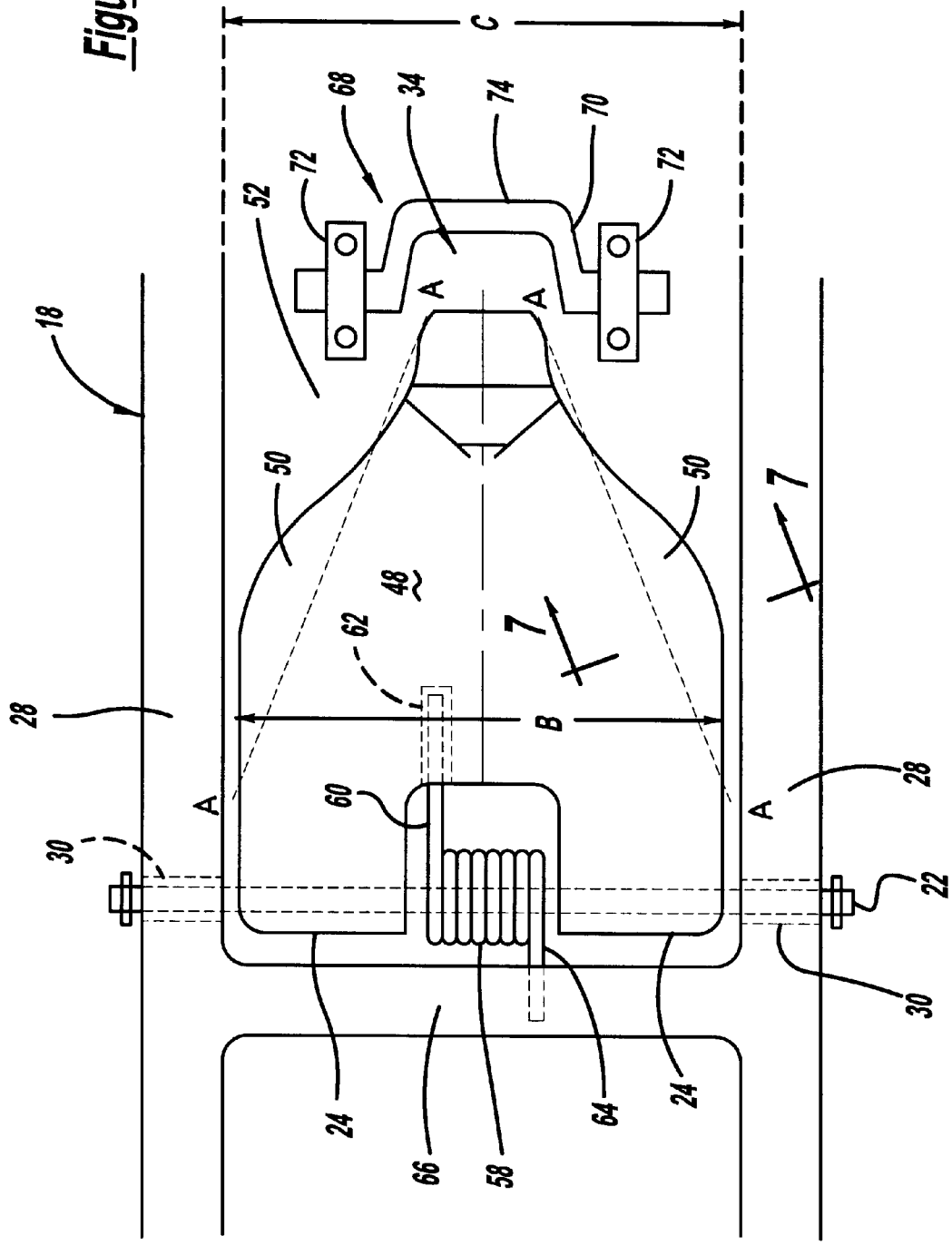
FIG. 4 is an enlarged plan view illustrating the retaining member of the present invention in the raised position.
Figure 5:
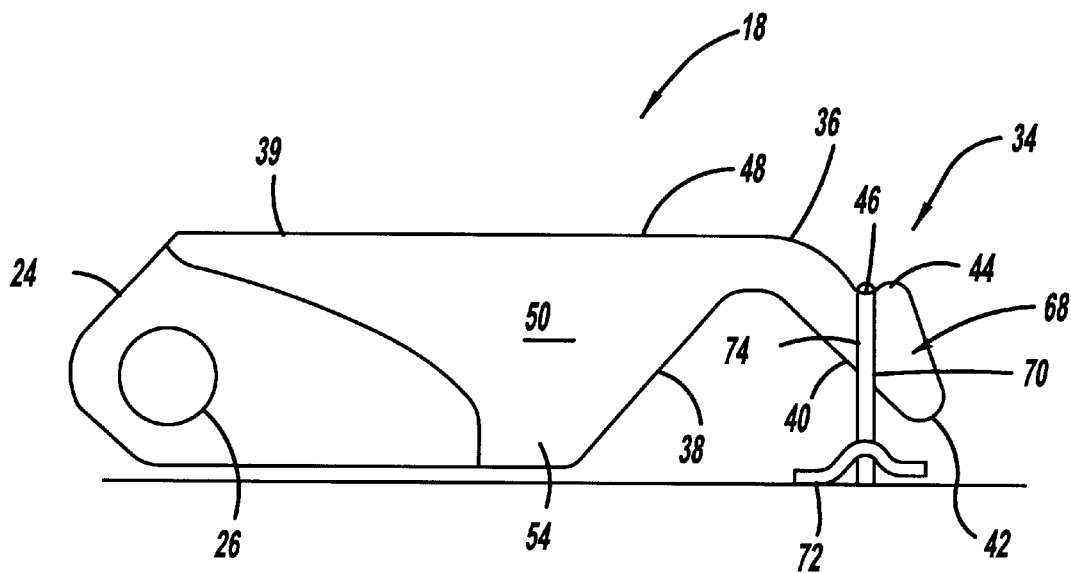
FIG. 5 is a side view, with portions removed for clarity, illustrating the retaining member in a stowed and locked position.
Figure 6:
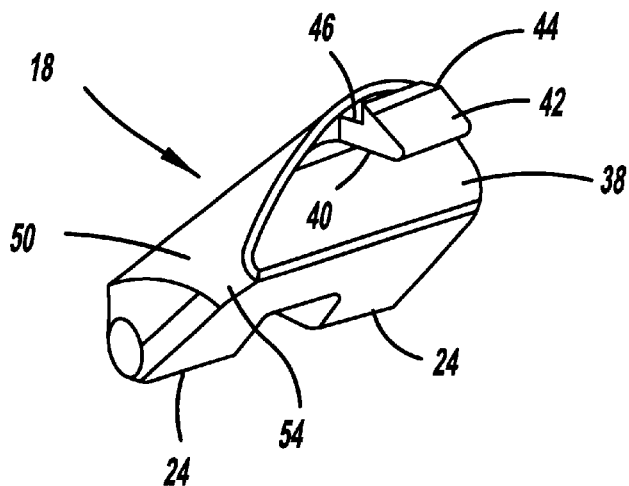
FIG. 6 is a perspective view illustrating the retaining member of the present invention.

As best seen in FIG. 3, retaining member 18 is pivotally coupled to base structure 12 via a pivot axle 22. Specifically, as seen in FIGS. 4–6, retaining member 18 is generally triangularly shaped and includes a pair of bifurcated legs 24 each having a bore 26 coaxially formed therethrough. Similarly, base structure 12 includes a pair of sidewalls 28 each having a bore 30 coaxially formed therethrough. Bores 26 of retaining member 18 and bores 30 of base structure 12 are adapted to receive pivot axle 22 therethrough to provide a pivoting relationship between retaining member 18 and base structure 12. According to the present embodiment, pivot axle 22 includes retaining devices 32, such as cotter pins, to permit the simple and reliable installation and retention of pivot axle 22 within bores 26, 30.

Still referring to FIGS. 4–6, retaining member 18 further includes a cargo pallet retaining flange 34. Cargo pallet retaining flange 34 generally includes an extension 36 that extends from a main body 39 of base structure 12. Extension 36 of cargo pallet retaining flange 34 generally includes a guide surface 38, which engages a vertical surface of cargo container 106 when retaining member 18 is in a raised position. Furthermore, guide surface 38 transitions into a cargo retaining surface 40, which is adapted to engage and retain a top surface of cargo container 106. Cargo retaining surface 40 generally transitions into a nose portion 42 and a hook portion 44 along a back side of retaining member 18. Hook portion 44 generally includes a depression 46 in which a locking member engages to retain retaining member 18 in a stowed position. The locking member will be described in more detail below. Hook portion 44 and depression 46 generally transition into a generally flat backside surface 48 that extends rearward to bifurcated legs 24.

As best seen in FIG. 6, retaining member 18 further includes a pair of camming surfaces 50. The purpose of camming surfaces 50 is to receive or engage cargo container 106 when cargo container 106 is being loaded on or unloaded from the aircraft. As described above, cargo container 106 is moved within cargo area 104 of aircraft 102 along roller elements 16 in a direction that is generally perpendicular to the direction of rotation of retaining member 18. As cargo container 106 contacts camming surface 50, cargo container 106 causes retaining member 18 to translate or rotate in a first or downward direction whereby retaining member 18 is generally received within a channel 52 of base structure 12 in a stowed position.

Figure 7:
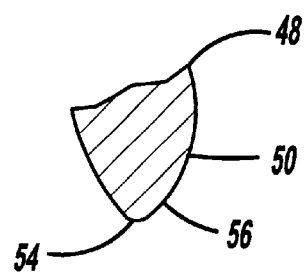
FIG. 7 is a partial cross-sectional view taken along line 7—7 of FIG. 4.

More particularly, as best seen in FIGS. 4 and 7, camming surfaces 50 generally include a pair of sidewalls 54 (FIG. 7), which transition into generally flat backside surface 48 via a radius or curve 56. Radius 56 is generally aligned along lines A—A so as to create camming surfaces 50 in a generally converging orientation that extends generally from bifurcated legs 24 to cargo pallet retaining flange 34. This converging or inwardly directed direction of camming surfaces 50 enables cargo container 106 to approach from a side of retaining member 18 and engage camming surface 50 such that a portion of the resultant force causes retaining member 18 to translate downwardly, thereby allowing cargo restraint system 10 to act in a overrideable manner.

Cargo restraint system 10 further includes a biasing member 58, such as a torsion spring, which is generally located about pivot axle 22. Biasing member 58 includes a first leg 60 which is received within a slot 62 formed within retaining member 18 between bifurcated legs 24. Biasing member 58 includes a second leg 64 that engages a cross-member 66 that extends between sidewalls 28 of base structure 12. Biasing member 58 is adapted to bias retaining member 18 in the raised or retaining position (FIG. 3). In this retaining position, retaining member 18 engages a flange or corner of cargo container 106 such that guide surface 38 is generally adjacent to a vertical surface of the flange of cargo container 106 and cargo retaining surface 40 is generally adjacent to a horizontal surface of the flange of cargo container 106.

As best seen in FIGS. 4 and 5, cargo restraint system 10 further includes a locking device 68 used for locking or securing retaining member 18 in a lowered or stowed position. Specifically, as seen in FIG. 8, locking device 68 includes a generally U-shaped member 70 that is pivotally attached within channel 52 of base structure 12. U-shaped member 70 is pivotally attached to base structure 12 via a pair of brackets 72. In operation, retaining member 18 is pivoted downward into the stowed position and held in that position as locking device 68 is rotated upward so as to engage an upper section 74 of U-shaped member 70 with depression 46 of retaining member 18. Once upper section 74 engages depression 46, retaining member 18 may be released such that the biasing force of biasing member 58 causes retaining member 18 to pivot upward and against locking device 68. This arrangement secures retaining member 18 within the stowed position.

As best seen in FIGS. 3 and 4, it is important to note that cargo restraint system 10 of the present invention does not include any wing-type feature that may be susceptible to being snagged or otherwise caught by cargo container 106 or netting within cargo area 104 of aircraft 102. Specifically, as can be seen from the figures, retaining member 18 generally defines a maximum overall width B (FIG. 4) that is less than the internal width between sidewalls 28 of base structure 12, generally indicated as dimension C (FIG. 4). Accordingly, such ability to retain the overriding function of the retaining member while eliminating the disadvantage of the wing-type feature, enables the cargo restraint system 10 of the present invention to minimize the likelihood of damage to the retaining member, base structure 12, and/or cargo flooring of aircraft 102, which may be caused by the inadvertent snagging or contact of the retaining member by cargo container 106. As described above, such inadvertent contact or snagging may cause damage to various parts of the cargo restraint system, which could lead to a down time of the aircraft.

The cargo restraint system, according to the principles of the present invention, may be used in a wide variety of cargo restraint applications. For example, the cargo restraint system of the present invention may be used in any 1¼" cargo system which could be used in the Boeing 717, 727, 737, and 757 or in the DC-9, MD-80, and MD-90. Furthermore, with minor dimensional modifications, the cargo restraint system of the present invention may also be used in any 1¾" system which could be used in the Boeing 747, 767, and 777 or in the DC-10 and MD-11.

In addition to the advantage of the present invention set forth above, it should be appreciated that the cargo restraint system of the present invention allows for numerous advantages with regard to the reduction in the size of the retaining member, which equates to a reduction in material use and the size of any forging dies. Moreover, the cargo restraint system of the present invention requires less machining time relative to the wing-type design since a lesser portion of the retaining member includes such camming surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cargo restraint system for retaining a cargo pallet, said cargo restraint system comprising:
  a frame having a receiving channel; and
  a pallet latching member rotatably coupled at a first end to said frame for pivotal movement between a stowed position and a retaining position, said latching member having a pair of camming surfaces engageable with the cargo pallet for urging said pallet latching member into said stowed position in a response to movement of the cargo pallet thereover, said pallet latching member having an overall maximum width that is less than a width of said receiving channel of said frame to minimize the potential for damage to said pallet latching member caused by inadvertent snagging of the pallet latching member by the cargo pallet, said pair of the camming surfaces generally converging from said first end of said pallet latching member to a second end, thereby generally forming a delta shape.

2. The cargo restraint system according to claim 1 wherein said pair of camming surfaces extend between a pair of opposing sidewalls of said pallet latching member and a top surface of said pallet latching member.

3. The cargo restraint system according to claim 2, further comprising:

an axle extending through said frame, said axle pivotally supporting said pallet latching member; and
  a spring member biasing said pallet latching member in said retaining position.

4. The cargo restraint system according to claim 1 wherein said pallet latching member is pivotable in a direction generally perpendicular to the movement of the cargo pallet.

5. The cargo restraint system according to claim 1, further comprising:
  a locking member selectively retaining said pallet latching member in said stowed position.

6. The cargo restraint system according to claim 5 wherein said pallet latching member further includes:
  a pallet retaining flange at a second end of said pallet latching member engageable with the cargo pallet while in said retaining position for retaining the cargo pallet.

7. The cargo restraint system according to claim 6 wherein said locking member is a clamp extending over said pallet retaining flange.

8. A cargo restraint system having a cargo pallet latch for securing a cargo pallet, said cargo pallet latch being capable of minimizing the likelihood of snagging of said cargo pallet latch, said latch comprising:
  a base structure having a channel; and
  a restraint member pivotally coupled within said channel of said base structure for retaining the cargo pallet when in a raised position, said restraint member having a pair of converging camming surfaces extending along opposing sides thereof, said pair of camming surfaces being engageable with the cargo pallet to urge said restraint member into a retracted position in response to movement of the cargo pallet thereover, said restraint member having an overall maximum width that is less than a width of said channel of said base structure to minimize the potential for damage to said restraint member caused by inadvertent snagging of said restraint member by the cargo pallet, said pair of converging camming surfaces converging from a first end of said restraint member to a second end to form a triangle.

9. The cargo restraint system according to claim 8 wherein said pair of converging camming surfaces extend between a pair of opposing sidewalls of said restraint member and a top surface of said restraint member.

10. The cargo restraint system according to claim 9, further comprising:
  an axle extending through said base structure, said axle pivotally supporting said restraint member; and
  a spring member biasing said restraint member in said raised position.

11. The cargo restraint system according to claim 8, further comprising:
  a locking member selectively retaining said restraint member in said retracted position.

12. The cargo restraint system according to claim 8 wherein said restraint member is pivotable in a direction generally perpendicular to the movement of the cargo pallet.

13. The cargo restraint system according to claim 8 wherein said restraint member further includes:
  a pallet retaining flange extending from said restraint member, said pallet retaining flange engageable with the cargo pallet while in said raised position for retaining the cargo pallet.

14. A cargo restraint system for retaining a cargo pallet, said cargo restraint system comprising:

a frame having a receiving channel; and a latching member rotatably coupled at a first end to said frame for pivotal movement between a stowed position and a raised position, said latching member having a pair of camming surfaces engageable with the cargo pallet for urging said latching member into said stowed position in response to movement of the cargo pallet thereover, said latching member having an overall maximum width that is less than a width of said receiving channel of said frame, said pair of camming surfaces converging such that said latching member is delta shaped.

15. The cargo restraint system according to claim 14, further comprising:

a locking member selectively retaining said latching member in said stowed position.

16. The cargo restraint system according to claim 15 wherein said locking member is a clamp extending over a pallet retaining flange.

17. The cargo restraint system according to claim 14 wherein said pair of camming surfaces extend between a pair of opposing sidewalls of said latching member and a top surface of said latching member.

18. The cargo restraint system according to claim 14, further comprising:

an axle extending through said frame, said axle pivotally supporting said latching member; and a spring member biasing said latching member into said raised position.

19. The cargo restraint system according to claim 14 wherein said latching member is pivotable in a direction generally perpendicular to the movement of the cargo pallet.

20. The cargo restraint system according to claim 14 wherein said latching member further includes:

a pallet retaining flange at a second end of said latching member engageable with the cargo pallet while in said raised position.

\* \* \* \* \*